United States Patent [19]

Keenan

[11] Patent Number: 5,745,682
[45] Date of Patent: Apr. 28, 1998

[54] METHOD AND APPARATUS FOR UTILIZING LOCATION CODES TO IDENTIFY A PHYSICAL LOCATION OF A COMPUTER STATION ON A NETBIOS COMPUTER NETWORK

[75] Inventor: David L. Keenan, Tinton Falls, N.J.

[73] Assignee: NCR Corporation, Dayton, Ohio

[21] Appl. No.: 566,767

[22] Filed: Dec. 4, 1995

[51] Int. Cl.[6] .................................................. G06F 15/177
[52] U.S. Cl. ..................................... 395/200.5; 395/200.8
[58] Field of Search ........................... 395/200.02, 200.1, 395/200.12, 200.2, 200.21, 183.01, 183.22, 200.5, 200.51, 200.52, 200.53, 500.56, 200.79, 200.8, 681, 682; 370/254, 257

[56] References Cited

U.S. PATENT DOCUMENTS 4,718,005  1/1988  Feigenbaum et al. ............. 395/200.52
4,930,159  5/1990  Kravitz et al. ............................ 380/23
5,179,554  1/1993  Lomicka et al. ......................... 370/257
5,588,119  12/1996  Vincent et al. ..................... 395/200.53

*Primary Examiner*—Parshotam S. Lall
*Assistant Examiner*—Viet Vu
*Attorney, Agent, or Firm*—Matthew J. Hodulik

[57] ABSTRACT

A computer station location method and apparatus is disclosed which is efficient, simple and reliable. The invention utilizes a location code to indicate a physical location of a computer station of interest on a computer network. When users connect to the computer network, the users will specify location codes indicative of the physical locations of the particular computer stations on which the users are operating. The location codes are stored in name tables of the computer stations if those location codes are unique, i.e., not stored in the name tables of any computer station on the computer network. To determine the physical location of a computer station of interest, an interrogation of the name table of the computer station of interest is performed using the hexadecimal address of the computer station of interest.

19 Claims, 2 Drawing Sheets

METHOD AND APPARATUS FOR UTILIZING LOCATION CODES TO IDENTIFY A PHYSICAL LOCATION OF A COMPUTER STATION ON A NETBIOS COMPUTER NETWORK

BACKGROUND OF THE INVENTION

1. Field of the Invention

The present invention relates to the field of computer networks, and more particularly to a method and apparatus adapted to determine the physical location of a station on a computer network.

2. Background

A computer network is comprised of a plurality of stations physically attached to the computer network at different locations. It is often difficult to determine the specific physical location of a station on a large computer network. For example, if a particular station is causing a problem on the computer network, typical prior art systems can ascertain a hexadecimal address of the specific problematic station on the computer network, however determining the specific physical location of the problematic station is often time consuming and difficult. Thus, there exists a need for determining the physical location of a station on the computer network in a efficient, simple and reliable manner.

In current NetBIOS based computer networks, each station coupled to the computer network has a unique hexadecimal address which is used to identify the station on the computer network. If a problem occurs with one of the stations on the computer network, typical prior art systems can determine the hexadecimal address of the problematic station. Specifically, the typical prior art systems utilize packet trace analysis which involves capturing all data packets transmitted over the computer network and decoding the captured data packets. The result of packet trace analysis is the retrieval of the hexadecimal address of the problematic station.

The hexadecimal address alone usually does not provide any indication regarding the specific physical location of the problematic station. To determine the physical location of the problematic station, a detailed list of hexadecimal addresses and the corresponding physical locations is required. This list must be continuously updated whenever a station is added to the computer network or physically moved or removed. In the absence of such a list, the process for finding the problematic station can be laborious and time consuming.

Accordingly, a need exists for an efficient, simple and reliable method and apparatus for determining the physical location of a station on a computer network.

SUMMARY OF THE INVENTION

The present invention discloses a method and apparatus for determining a physical location of a specific computer station on a computer network. Each station includes a network adapter, a processor, data storage means and computer memory. The network adapter further includes adapter memory for storing a hexadecimal address identifying the computer station and a name table for storing names. The present invention method comprises the steps of: specifying location codes for computer stations operating on the computer network; posting the location codes being specified as names in a name table of the computer station on which the location codes are being specified if the location codes being specified are unique; determining the hexadecimal address of the computer station of interest on the computer network; and interrogating the name table of the computer station of interest using the hexadecimal addresses of the computer station in order to obtain the corresponding location code. The location codes are indicative of the physical locations of the computer stations on which the location codes are being specified. The location code is unique if the location code is not stored in any name table of any computer station on the computer network.

Advantageously, the present invention method further includes the step of detecting whether networking software is present in the computer memory of the computer station on which the location code is being specified prior to the step of posting the location code. Specifically, the processors are instructed to analyze the computer memory for the presence of the networking software.

The present invention apparatus comprises: means for specifying the location code on the computer station on the computer network; and means for storing the location code in the adapter memory of the computer station. The means for storing the location code includes means for determining whether the location code is unique. The location code is unique if the location code is not stored in the name table of any computer station on the computer network. The apparatus of the present invention further comprises: means for determining the hexadecimal address of the computer station of interest on the computer network; and means for interrogating the name table of the computer station of interest for the location code stored in the adapter memory using the hexadecimal address.

These and other features, aspects, and advantages of the present invention will become better understood with regard to the following description, appended claims, and accompanying drawings.

BRIEF DESCRIPTION OF THE DRAWINGS

For a better understanding of the present invention, reference may be had to the following description of exemplary embodiments thereof, considered in conjunction with the accompanying drawings, in which.

DETAILED DESCRIPTION

Figure 1:
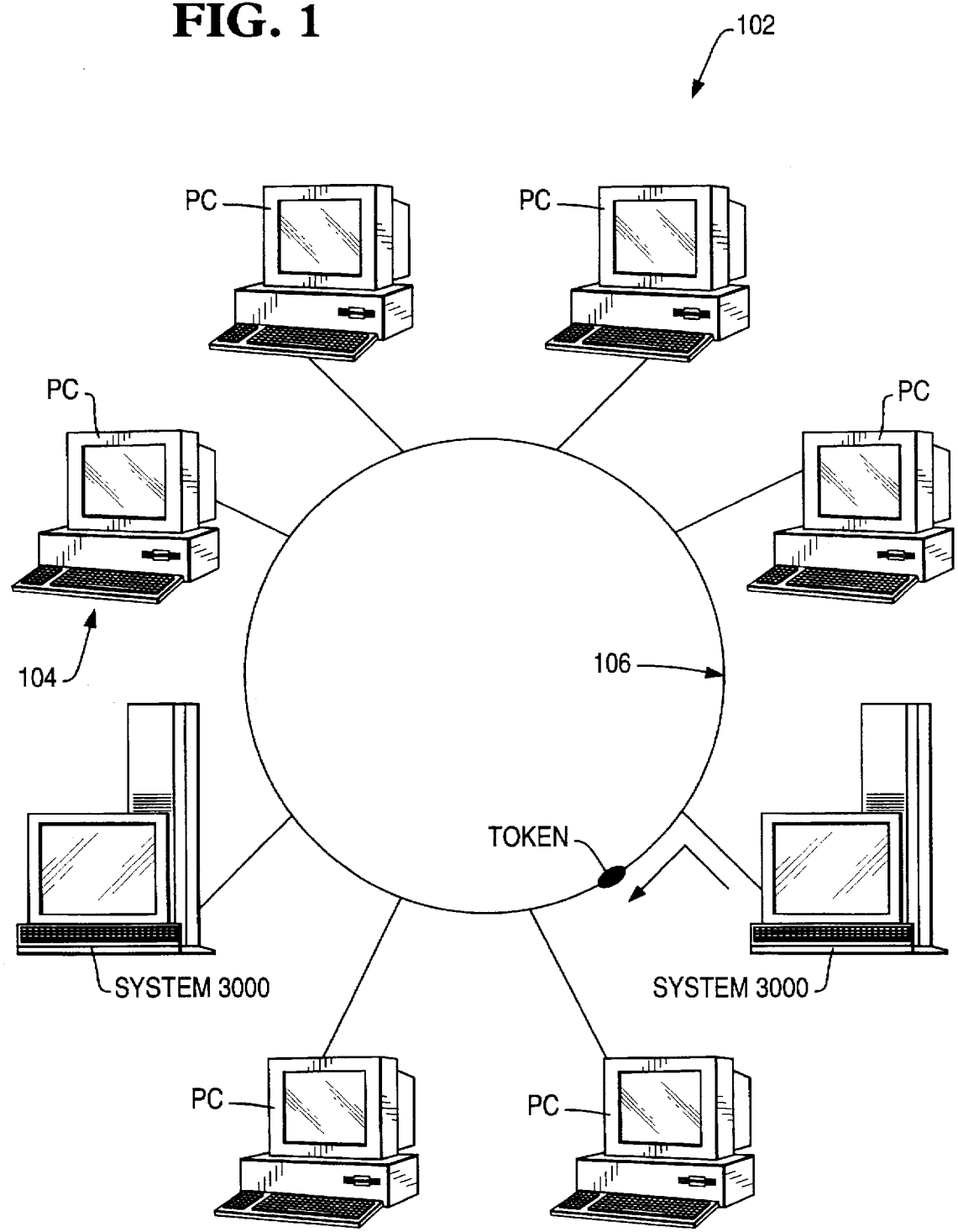
FIG. 1 depicts a token-ring network which the present invention may be comprised.

The present invention is a method and apparatus adapted to determine the physical location of a station on a computer network. Referring to FIG. 1, there is illustrated an embodiment of a local area network 102 with which the present invention may be utilized. The local area network 102 depicted is a well-known token-ring network. The token-ring network has a plurality of endpoints, including stations 104, coupled to one another by cables 106. The stations 104 are of a multi-layered architecture of hardware, firmware and software that connects to the token-ring network. It should be understood that the present invention described herein is equally applicable to other types of computer networks.

Figure 2:
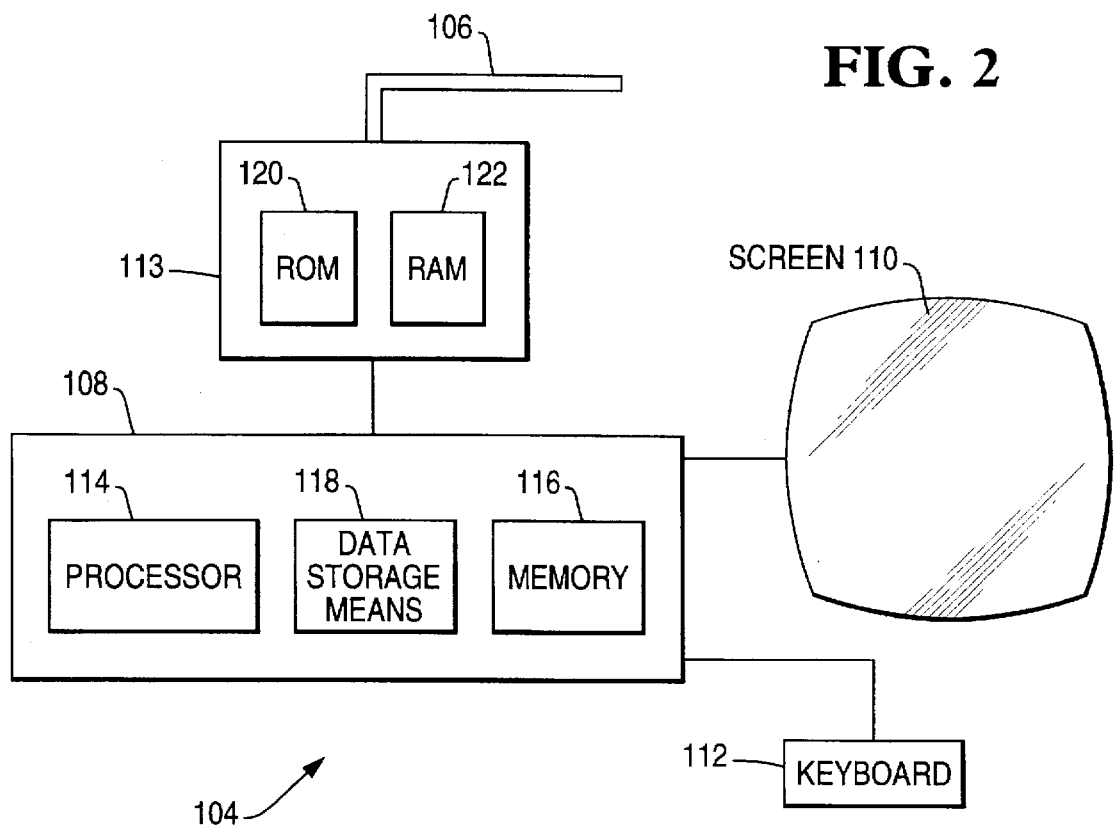
FIG. 2 depicts a station connected to the token-ring network depicted in FIG. 1.

Referring to FIG. 2, each of the stations 104 include, for example, a computing unit 108, a display or video display terminal 110, an input device 112, such as a keyboard, and a network adapter 113. The video display 110, input device 112 and network adapter 113 are coupled to the computer unit 108. Each of the computing units 108 further includes a processor 114 for interpreting and executing instructions, computer memory 116 for use in executing instructions and data storage means 118 among other components. The network adapters 113 are peripheral devices coupled to the computing units 108 and cables 106 which allow the stations 104 to communicate with other stations 104 on the same local area network 102. The network adapters 113 include read-only memory (ROM) 120 and random access memory (RAM) 122.

The stations 104 include networking software which is loaded into the computer memory 116 when the stations 104 are powered on or booted. Networking software is software that permits the stations 104 to communicate with each other over the same local area network 102. Networking software comprises a variety of different software programs including a transport-level protocol and a session-level interface (also referred to herein as "session-level protocol") to the transport-level protocol. The transport-level protocol is software which provides a set of semantic and syntactic rules for reliable data transfer from one station 104 on the local area network 102 to another station 104 on the same local area network 102 using hexadecimal addresses. The session-level protocol is software used in conjunction with the transport-level protocol that allows point-to-point communication between named endpoints on the local area network 102. Hexadecimal addresses and named endpoints will be explained herein. The preferred session-level protocol of the present invention is a well-known Network Basic Input/Output System (also referred herein as "NetBIOS"). The present invention applies to any network transport-level protocol that supports a NetBIOS session-level interface.

Stored within the ROM 120 of the network adapters 113 are unique hexadecimal addresses assigned to the particular network adapter 113 in which the ROM 120 resides. The hexadecimal address identifies the station 104 on the local area network 102 to which that the particular network adapter 113 is coupled. To transmit data from one station 104 to another, the transport-level protocol must be provided with the hexadecimal address of the receiving station 104. In NetBIOS based networks, i.e., local area networks that use NetBIOS as the session-level interface, each station 104 also has a unique one-to-sixteen character network name. These stations 104 with network names are named endpoints on the local area network 102. The NetBIOS session-level interface includes software that translates the network name to the hexadecimal address stored in the ROM 120 of the network adapter 113. Thus, the NetBIOS session-level protocol permits data transfer from one station 104 to another station 104 using network names instead of hexadecimal addresses.

The NetBIOS session-level interface further includes software for storing the network name in a name table. The phrase "name table" is a conceptual term that refers to an area of memory located typically in the RAM 122 of the network adapter 113 for storing a multitude of names. The phrase "local name table" refers to a name table located on a particular station 104 to which the network adapter 113 is coupled thereto. Before any network names are added or posted in any local name table on the local area network 102, a broadcast is performed, i.e., transmission of the same data to all stations 104 on the local area network 102. The broadcast ensures that the network name to be posted is a unique name on the local area network 102, i.e., no local name table connected to the local area network 102 contains the name to be posted. If the network name to be posted is not a unique name, an error code is returned. Otherwise the network name is posted in the local name table. One embodiment of the present invention uses the well-known NetBIOS "ADD NAME" command to post the network name in the local name table.

The present invention discloses a method and apparatus for determining the physical location of a station on a local area network and comprises three operations: registration, posting and enumeration. Registration requires a user on the local area network 102 to designate a location code for the particular station 104 which is being operated by the user. The location code is indicative of the physical location of the particular station 104. For example, the location code could include the state, city and room number of the office where the station is located. Or it could be a phone number or an E-mail address. Whatever the convention, the location code cannot be longer than sixteen characters. The present invention includes registration software for registering a location code. In a preferred embodiment of the present invention, the registration software runs automatically when the station 104 is powered on or booted and prompts the user on the local area network 102 to enter a location code. Upon input of the location code by the user, the registration software stores the location code in a file (also referred herein as "location code file") on the data storage means 118 of the station 104 on which the location code is being specified.

Figure 3:
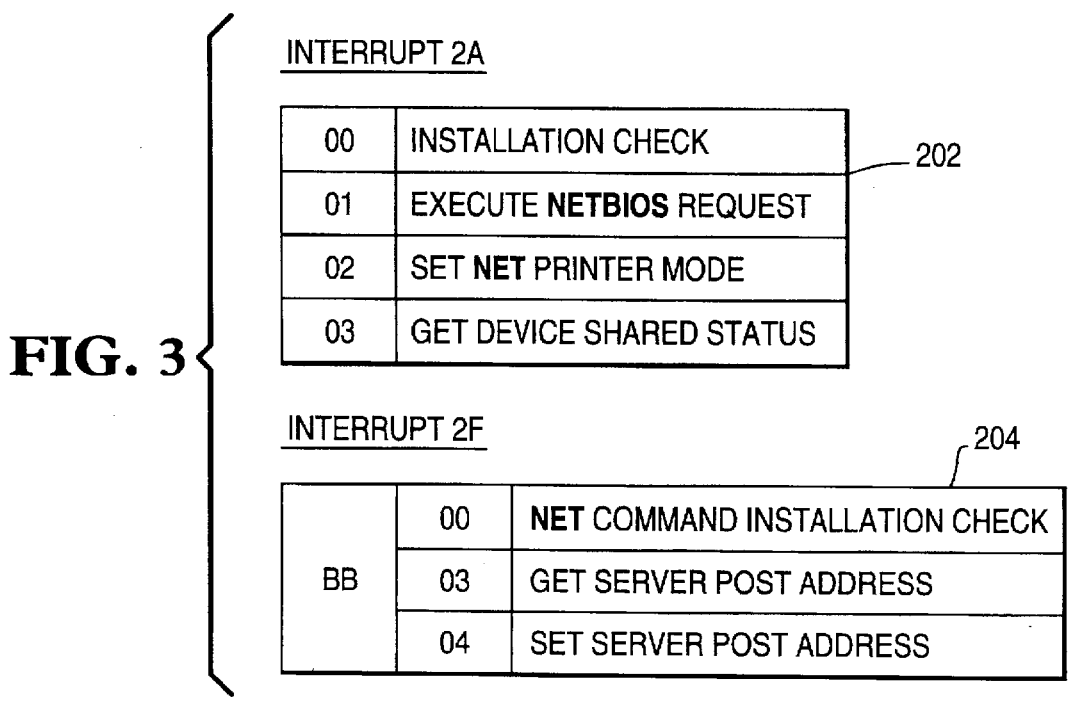
FIG. 3 depicts the well-known NetBIOS "INTERRUPT 2A" and "INTERRUPT 2F" CALLS.

The second operation is posting. Posting is the act of adding the location code as a name in the local name table of the network adapter 113 to which the particular station 104 is coupled. The present invention includes posting software that automatically detects whether networking software has been loaded into the computer memory 116 of the station 104 on which the location code is being specified. One embodiment of the present invention utilizes a well-known NetBIOS "INTERRUPT 2A" or "INTERRUPT 2F" call, as shown in FIG. 3 by tables 202 and 204, respectively, to detect whether networking software has been loaded. Specifically, the INTERRUPT 2A and INTERRUPT 2F calls are used to instruct the processors 114 to check the computer memory 116 for the presence of the components that comprise the networking software, including the transport-level protocol and session-level interface. A successful INTERRUPT 2A or INTERRUPT 2F call indicates that the networking software has been loaded on the particular station 104 on which the location code is being specified. Upon detection of the networking software, the posting software references a location code file and checks whether the location code exists as a name in any local name table on the local area network 102 by attempting to post or add the location code as a name in the local name table. Posting is achieved programmatically using the well-known NetBIOS "ADD NAME" command. The location code will not be posted if either the location code is not a unique name on the local area network 102 or the networking software is not loaded on the station 104.

Once the location codes are posted in the local name table of every station on the local area network, the present invention can determine the physical location of any station 104 on the local area network 102. In a preferred embodiment of the present invention, enumeration software is provided for interrogating the local name table of a station of interest, such as a station causing a problem on the computer network or a station illegally connected to the computer network. To interrogate the local name table, the hexadecimal address of the station of interest must be known. In one embodiment of the present invention, a transport-level protocol analyzer is used to obtain the hexadecimal address of the station of interest. Preferably, the transport-level protocol analyzer utilizes a well-known packet trace analysis technique to capture all data packets transmitted over the cables 106 of the local area network 102 and to decode these data packets being captured into appropriate protocol information for debugging purposes. Included within the data packets are the hexadecimal addresses of the stations from which the data packets originated. The end result of packet trace analysis is the determination of the hexadecimal address of the station of interest. The manner in which packet trace analysis captures the data packets and decodes the captured data packets is well-known in the art. Some examples of commercial packet trace analysis products include the Sniffer from Network General Corporation and the LANalyzer from Excelan.

Once the hexadecimal address is known, the enumeration software can interrogate the local name table of the station of interest using the well-known NetBIOS "ADAPTER STATUS" command. Successful interrogation returns a list of the names posted in the local name table of the station of interest, which includes the network name and the location code.

Although the present invention has been described in considerable detail with reference to certain preferred embodiments, other embodiments are also applicable. Therefore, the spirit and scope of the appended claims should not be limited to the description of the preferred embodiments contained herein.

I claim:

1. A method for determining a physical location of a computer station on a computer network, wherein each computer station on said computer network includes an address identifying said computer station and a name table for storing names, said method comprising the steps of:

selecting a network name for each said computer station, said network name permitting data transfer from one computer station to another computer station, said network name being posted on said name table if said network name is unique:

specifying a location code for said computer station on said computer network, said location code indicative of a physical location of said computer station for which said location code is being specified; and posting said location code as a name in said name table of said computer station for which said location code is being specified, said step of posting only occurring if said location codes is unique, said location code being unique if said location code is not stored in name tables of any other said computer stations on said computer network.

2. The method recited in claim 1 wherein the step of specifying said location code includes:

storing said location code in a file on said computer station for which said location code is being specified.

3. The method recited in claim 2 wherein the step of posting said location code includes:

referencing said file on said computer station for said location code.

4. The method recited in claim 1 comprising the additional step of:

detecting whether networking software is present in computer memory of said computer station for which said location code is being specified prior to the step of posting said location code, said networking software including software for enabling said computer stations on said computer network to communicate with other said computer stations on same said computer network.

5. The method recited in claim 4 wherein the step of detecting whether said networking software is present includes:

instructing a processor of said computer station for which said location code is being specified to examine said computer memory for presence of said networking software.

6. The method recited in claim 4 wherein the step of detecting whether said networking software is present includes:

executing a NetBIOS INTERRUPT 2A call to examine said computer memory of said computer station on which said location code is being specified for presence of said networking software.

7. The method recited in claim 4 wherein the step of detecting whether said networking software is present includes:

executing a NetBIOS INTERRUPT 2F call to examine said computer memory of said computer station for which said location code is being specified for presence of said networking software.

8. The method recited in claim 1 wherein said address is a hexadecimal address and comprising the additional steps of:

determining said hexadecimal address of a selected computer station on said computer network; and interrogating said name table of said selected computer station for said location code using said hexadecimal address being determined.

9. The method recited in claim 8 wherein the step of determining said hexadecimal address of said selected computer station includes:

conducting a packet trace analysis of said computer network, said packet trace analysis including capturing data packets transmitted over said computer network and decoding said data packets being captured to determine said hexadecimal address of said selected computer station on said computer network, said data packets include hexadecimal addresses of said computer stations from which said data packets originated.

10. The method recited in claim 8 wherein the step of interrogating said name table of said selected computer station includes:

displaying said names stored in said name table of said selected computer station in order to view said location code stored in said name table.

11. The method recited in claim 8 wherein the step of interrogating said name table of said selected computer station includes:

executing a NetBIOS ADAPTER STATUS command to retrieve said location code stored in said name table of said selected computer station.

12. The method recited in claim 1 comprising the additional step of:

prompting a user for said computer station on said computer network to enter said location code for said computer station.

13. The method recited in claim 1 wherein the step of posting said location code includes:

executing a NetBIOS ADD NAME command for appending said location code being specified as a name in said name table of said computer station for which said location code is being specified.

14. An apparatus for determining a physical location of a computer station of interest on a computer network, wherein each computer station on said computer network includes a network adapter and computer memory, said network adapter having adapter memory for storing an address identifying said computer station and a location code indicating said physical location of said computer station, said apparatus comprising of:

means for establishing a network name for a computer station;

means for specifying a location code for said computer station on said computer network; and means for storing said location code in said adapter memory of said computer station, said means for storing said location code including means for determining whether said location code is unique, said location code being unique if said location code is not stored in said name table of any said computer station on said computer network.

15. The apparatus recited in claim 14 further comprising:

means for detecting whether networking software is present in said computer memory of said computer station, said networking software includes software that enables said computer station on said computer network to communicate with other said computer station on same said computer network.

16. The apparatus recited in claim 14 further comprising:

means for determining said address of said computer station of interest on said computer network.

17. The apparatus recited in claim 16 wherein said means for determining said address of said computer station of interest is operable to utilize packet trace analysis to capture data packets transmitted over said computer network and decode said data packets being captured to determine said address of said computer station of interest on said computer network, said data packets include addresses of said computer stations from which said data packets originated.

18. The apparatus recited in claim 16 further comprising:

means for interrogating said name table of said computer station of interest for said location code stored in said adapter memory using said address.

19. The apparatus recited in claim 18 further comprising:

means for displaying said location code stored in said name table of said computer station of interest in order to determine said physical location of said computer station of interest.

\* \* \* \* \*